US007928807B2

(12) United States Patent
Mishra

(10) Patent No.: US 7,928,807 B2
(45) Date of Patent: Apr. 19, 2011

(54) FREQUENCY SYNTHESIZER ARCHITECTURE FOR MULTI-BAND ULTRA-WIDEBAND SYSTEM

(75) Inventor: Chinmaya Mishra, College Station, TX (US)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 11/228,969

(22) Filed: Sep. 16, 2005

(65) Prior Publication Data
US 2007/0066262 A1    Mar. 22, 2007

(51) Int. Cl.
*H03B 21/02* (2006.01)
*H03L 7/16* (2006.01)
*H04B 1/26* (2006.01)

(52) U.S. Cl. .......... 331/22; 331/38; 331/40; 331/41; 331/42; 455/314; 455/323

(58) Field of Classification Search .......... 331/22, 331/31, 37–42, 30; 375/130, 260, 344; 455/313, 455/314, 323
See application file for complete search history.

(56) References Cited

U.S. PATENT DOCUMENTS

| | | | | |
|---|---|---|---|---|
| 2,886,708 A * | 5/1959 | Perkins et al. | ........ | 331/18 |
| 3,644,827 A * | 2/1972 | Landefeld | ........ | 324/76.43 |
| 4,580,289 A * | 4/1986 | Enderby | ........ | 455/314 |
| 4,673,891 A * | 6/1987 | Remy | ........ | 331/2 |
| 5,606,736 A * | 2/1997 | Hasler et al. | ........ | 455/314 |
| 5,966,055 A * | 10/1999 | Knoedl et al. | ........ | 332/103 |
| 6,888,413 B1 * | 5/2005 | Adams et al. | ........ | 331/17 |
| 6,960,962 B2 * | 11/2005 | Peterzell et al. | ........ | 331/40 |
| 7,522,898 B2 * | 4/2009 | Heidari et al. | ........ | 455/255 |
| 7,522,989 B2 | 4/2009 | Matsuda | | |
| 2005/0143041 A1 * | 6/2005 | Lee et al. | ........ | 455/313 |
| 2007/0177653 A1 * | 8/2007 | Bjerede | ........ | 375/130 |

OTHER PUBLICATIONS

Weinstein et al., "Data Transmission by Frequency-Division Multiplexing Using the Discrete Fourier Transform", IEEE Transaction on Communication Technology, vol. Com-19, No. 5, Oct. 1971, pp. 628-634.
Razavi et al., "A 0.13mu CMOS UWB Transceiver", ISSCC 2005/Session 11/Ultra Wideband Solutions/11.9, 2005 IEEE International Solid-State Circuits Conference, pp. 216-217, 594.
Medi et al., "A Fully Integrated Multi-Output CMOS Frequency Synthesizer for Channelized Receivers", Department of Electrical Engineering—University of Southern California.

(Continued)

*Primary Examiner* — Robert Pascal
*Assistant Examiner* — Levi Gannon
(74) *Attorney, Agent, or Firm* — Sam Talpalatsky; Nicholas J. Pauley; Jonathan T. Velasco

(57) ABSTRACT

The present invention provides a frequency synthesizer for a wireless communication system. The synthesizer includes an oscillator that generates an electronic signal as well as frequency dividers, frequency selectors and mixers. The signal generated by the oscillator is sequentially divided by the frequency dividers to produce a first group of frequencies, and the selectors and mixers are then capable of mixing the first group of frequencies according to instructions from control bits to produce a second group of frequencies which constitute UWB band frequencies. In this manner, the synthesizer can generate all 14 UWB band frequencies or particular UWB band groups using a single oscillator. One of the frequencies generated by the dividers can also be used as the baseband clock signal without requiring an additional frequency source.

20 Claims, 3 Drawing Sheets

OTHER PUBLICATIONS

Leenaerts et al., "A SiGe BiCMOS 1ns fast Hopping Frequency Synthesizer for UWB Radio", ISSCC 2005/Session 11/Ultra Wideband Solutions/11.2, 2005 IEEE International Solid-State Circuits Conference, pp. 202-203, 593.

Sandner et al., "A 3GHz to 7GHz Fast-Hopping Frequency Synthesizer for UWB", IEEE 2004, pp. 405-409.

Lee, "A 7-band 3-8GHz Frequency Synthesizer with Ins Band-Switching Time in 0.18mu CMOS Technology", ISSCC 2005/Session 11/Ultra Wideband Solutions/11.3, 2005 IEEE International Solid-State Circuits Conference, pp. 204-205.

Lin et al., "A Regenerative Semi-Dynamic Frequency Divider for Mode-1 MB-OFDM UWB Hopping Carrier Generation", ISSCC 2005/Session11/Ultra Wideband Solutions/11.4, 2005 IEEE International Solid-State Circuits Conference, pp. 206-207.

Ismail et al., "A 3.1 to 8.2 GHz Direct Conversion Receiver for MB-OFDM0 UWB Communications", ISSCC 2005/ Session11/Ultra Wideband Solutions/11.5, 2005 IEEE International Solid-State Circuits Conference, pp. 208-209, 593.

Vaucher, Cicero S., Architectures for RF Frequency Synthesizers, Kluwer Academic Publishers, 2002.

* cited by examiner

FREQUENCY SYNTHESIZER ARCHITECTURE FOR MULTI-BAND ULTRA-WIDEBAND SYSTEM

TECHNICAL FIELD

The invention relates generally to wireless communication, and more specifically to the generation of all the carrier frequencies complying with the Multi-band OFDM proposal for Ultra-Wideband communications in an efficient way with fewer components.

BACKGROUND OF THE INVENTION

Much recent interest has been directed towards the development of packet radio communication systems capable of providing data-intensive communication services. For instance, the IEEE 802.15.3a operating specification contemplates an Orthogonal Frequency Division Multiplexing (OFDM) Ultra Wide Band (UWB) communication system, capable of communicating data over wide bandwidths and short ranges.

Ultra Wideband is defined as any radio technology having a spectrum that occupies a bandwidth greater than 20 percent of the center frequency, or a bandwidth of at least 500 MHz. Modern UWB systems use modulation techniques such as OFDM to occupy these extremely wide bandwidths.

OFDM distributes data over a large number of carriers that are spaced at precise frequencies. This spacing provides the orthogonality in this technique, which prevents interference from adjacent tones. The benefits of OFDM include high-spectral efficiency, resiliency to radio frequency (RF) interference, and lower multipath distortion. OFDM used for UWB transmission results in a novel physical layer system for the enablement of high bit rate, short-range communication networks.

The seminal article on OFDM is "Data Transmission by Frequency-Division Multiplexing Using the Discrete Fourier Transform", by S. B. Weinstein and Paul M. Ebert in *IEEE Transactions on Communication Technology*, Vol. com-19, No. 5, October 1971, the contents of which are hereby incorporated by reference.

The Ultra-Wide Broadband (UWB) spectrum from 3.1-10.6 GHz is divided into 14 bands of 528 MHz each, implying 14 carrier frequencies. These bands are further grouped into band groups, each having two or three adjacent frequency bands (see FIG. 1).

The most common method used to generate each band frequency involves using a separate frequency source for each band frequency or a combination of such sources. There are some methods by which a single frequency source can generate several frequencies. However, since these methods require separate components for each frequency generated, the number of components increases while attempting to generate more band frequencies, resulting in a more complicated system.

Current state of the art implementations generate a maximum of seven carrier frequencies and do not completely comply with the current band plan of the Multi-band OFDM Alliance (MBOA) proposal shown in FIG. 1. Very few of the implementations use the concept of frequency switching within a particular band as is specified in the MBOA proposal in the mode of operations. This makes the implementation bulky and power hungry when the number of band frequencies to be generated increases.

Therefore, it would be desirable to have a frequency synthesizer capable of generating all 14 frequencies efficiently, while providing fast hopping capability within the band groups. Apart from this, the frequency synthesizer also should generate the baseband clock which could be 1056 MHz or 528 MHz depending on the baseband requirement. To lower cost, the frequency synthesizer, along with the UWB system, should be able to use components that are currently widely used for existing wireless standards.

SUMMARY OF THE INVENTION

The present invention provides a frequency synthesizer for a wireless communication system. The synthesizer includes an oscillator that generates an electronic signal as well as frequency dividers, frequency selectors and mixers. The signal generated by the oscillator is sequentially divided by the frequency dividers to produce a first group of frequencies, and the selectors and mixers are then capable of mixing the first group of frequencies according to instructions from control bits to produce a second group of frequencies which constitute UWB band frequencies. In this manner, the synthesizer can generate all 14 UWB band frequencies or particular UWB band groups using a single oscillator. One of the frequencies generated by the dividers can also be used as the baseband clock signal without requiring an additional frequency source.

In one embodiment of the present invention, the frequency synthesizer comprises part of a phase locked loop (PLL) in which one of the frequencies generated by the dividers is compared to a reference signal. A programmable divider allows this feedback signal to be compared to a variety of reference signals.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE DRAWINGS

Figure 2:
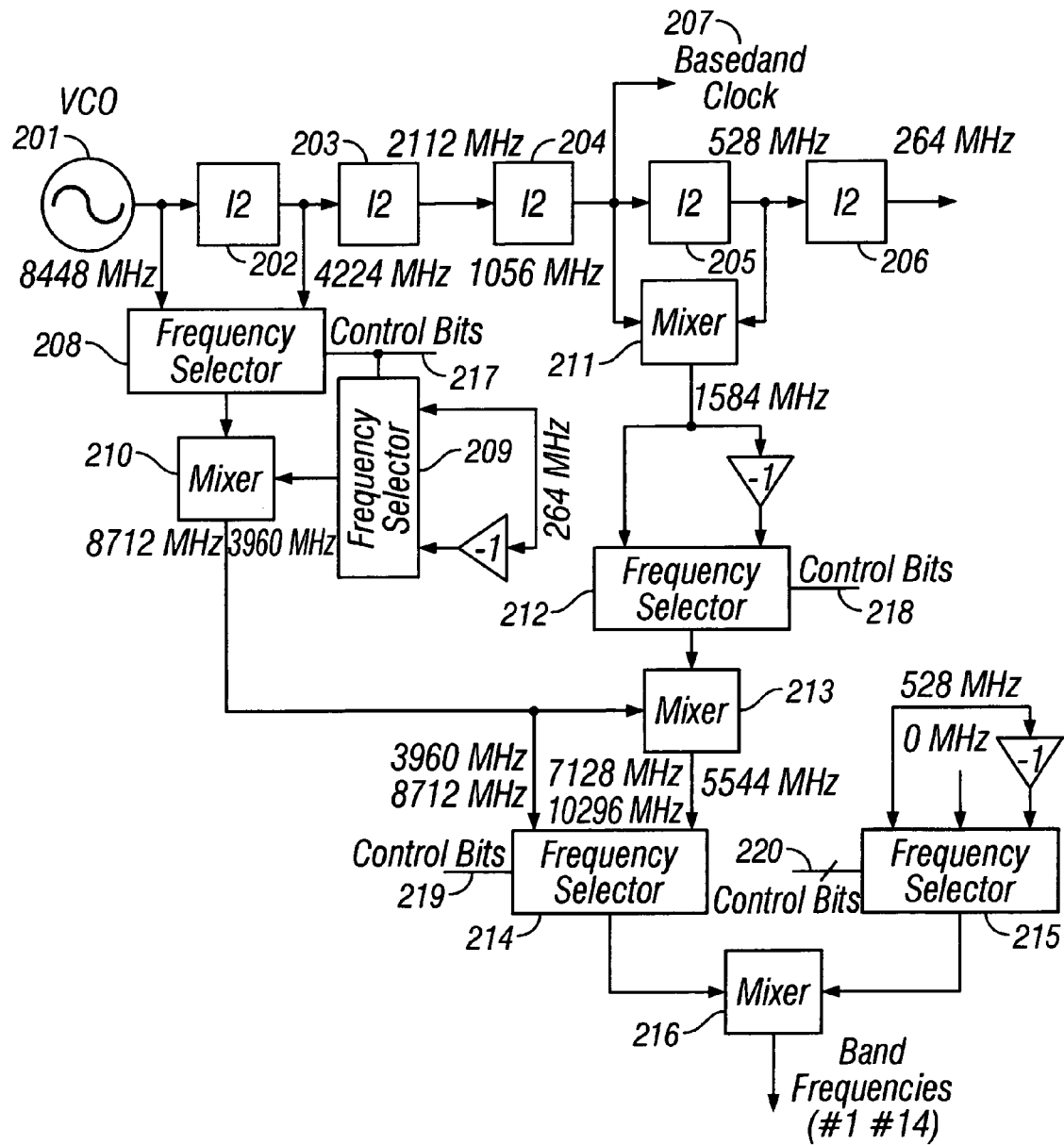
FIG. 2 is a circuit diagram illustrating a frequency synthesizer that can generate all 14 UWB band frequencies in the five band groups.

Referring now to FIG. 2, a circuit diagram illustrating a frequency synthesizer that can generate all 14 UWB band frequencies in the five band groups is depicted in accordance with the present invention. The basis of band frequency generation relies on the fact that frequency hopping occurs only within a band group as specified in the multi-band OFDM proposal and hence frequencies of only one band group need to be available at a particular time.

There are a number of ways to generate all 14 frequencies. However, an important aspect of the present invention is that it does not require an extra frequency source to generate the baseband clock. The baseband is the original band of frequencies of a signal before it is modulated and multiplexed for transmission at a higher frequency.

The baseband clock requirement of multi-band OFDM UWB systems is typically either 528 MHz or 1056 MHz, both of which can be generated within the architecture of the present invention during the process of generating the band frequencies.

Since frequency hopping is performed within a band group, the present invention is based on the generation of one band frequency in any band group, followed by generation of the other frequencies in the band group with the help of a frequency mixer. A mixer in a component that converts radio frequency (RF) power at one frequency into power at another frequency to make signal processing easier and inexpensive.

Figure 1:
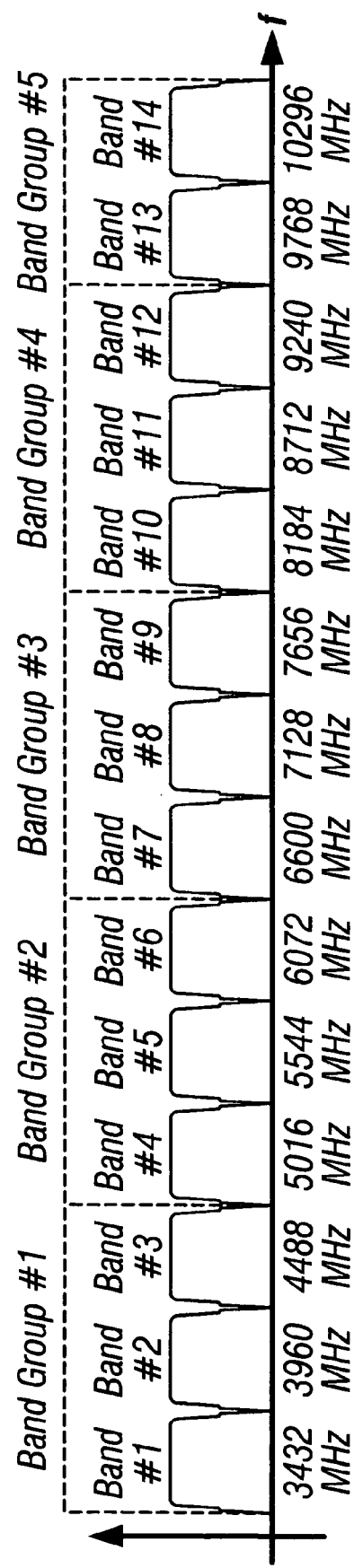
FIG. 1 shows the Multi-band OFDM Alliance plan for frequency bands and band groups of the Ultra-Wideband spectrum.

In one embodiment, the frequencies generated for each band group are band numbers 2, 5, 8, 11, and 14 (see FIG. 1). The other frequencies are generated from these frequencies using a frequency translation by 528 MHz. The generation of frequencies 2, 5, 8, 11, and 14 use the following mathematical relationship (all frequencies are in MHz):

Band #2 (3960)=4224−264
Band #5 (5544)=3960+1584
Band #8 (7128)=8712−1584
Band #11 (8712)=8448+264
Band #14 (10296)=8712+1584

In the example depicted in FIG. 2, the voltage controlled oscillator (VCO) 201 generates a signal of 8448 MHz. This signal is fed into both a divider 202 and a frequency selector 208. The first divider 202 divides the signal by two. The resulting 4224 MHz signal is then sent to another divider 203 and the first frequency selector 208.

The next divider 203 again divides the signal by two, producing a 2112 MHz signal, which is fed into another divider 204 that produces a 1056 MHz signal. This signal functions as the baseband clock 207 and is fed into another divider 205 and a second frequency mixer 211.

Divider 205 produces a 528 MHz signal which is also fed into mixer 211 as well as another divider 206, which produces a 264 MHz signal.

The signals produced by dividers 202-206 provide the necessary frequencies that are used by the frequency selectors and mixers to produce all 14 of the UWB band frequencies.

Returning to frequency selector 208, this selector can choose between 8448 or 4224 MHz, depending on input from the control bit 217. Control bit 217 also instructs selector 209 to select either 264 or −264 MHz. The frequencies selected by selectors 208 and 209 are then combined by mixer 210 to produce 8712 MHz (Band #11) or 3960 MHz (Band #2).

Mixer 211 combines the 1056 MHz signal from divider 204 with the 528 MHz signal from divider 205 to produce a 1584 MHz signal. This signal can be fed into frequency selector 212 as 1584 and −1584 MHz. Control bit 218 determines which sign is chosen by selector 212.

Mixer 213 combines 8712 MHz from mixer 210 with either 1584 or −1584 MHz from selector 212 to produce 10296 MHz (Band #14) or 7128 MHz (Band #8). Alternatively, 3960 MHz is combined with 1584 MHz to produce 5544 MHz (Band #5).

The frequencies produced by mixer 210 are also fed into frequency selector 214 along with the frequencies produced by mixer 213. At this point, the synthesizer architecture is able to produce one band frequency from each of the five band groups, although not all five band frequencies are available to the selector 214 simultaneously (one of two possible bands (2 or 11) will be available from mixer 210, and one of three possible bands (5, 8, or 14) will be available from mixer 213). The rest of the band frequencies can be produced by selecting a band frequency from selector 214 (specified by control bit 219) and adding or subtracting 528 MHz in mixer 216.

Control bits 220 instruct frequency selector 215 to provide either a 528 or −528 MHz signal if another frequency needs to be produced. Alternatively, if the band frequency from selector 214 is the desired frequency, the control bits 220 instruct the selector 215 to supply 0 MHz.

It should be pointed out that the example architecture show in FIG. 2 is designed to produce all 14 multi-band OFDM UWB band frequencies if needed. However, some UWB systems may not utilize all 14 bands and may only use one or two band groups. In these situations, the synthesizer architecture can be simplified to retain only those components that produce the needed UWB band groups. For example, if the system in question only uses band groups 1 and 4 mixers 211 and 213 and selectors 212 and 214 can be left out of the architecture. Alternatively, the architecture can be maintained in its entirety, and the unnecessary components can simply be shut down to save power.

Figure 3:
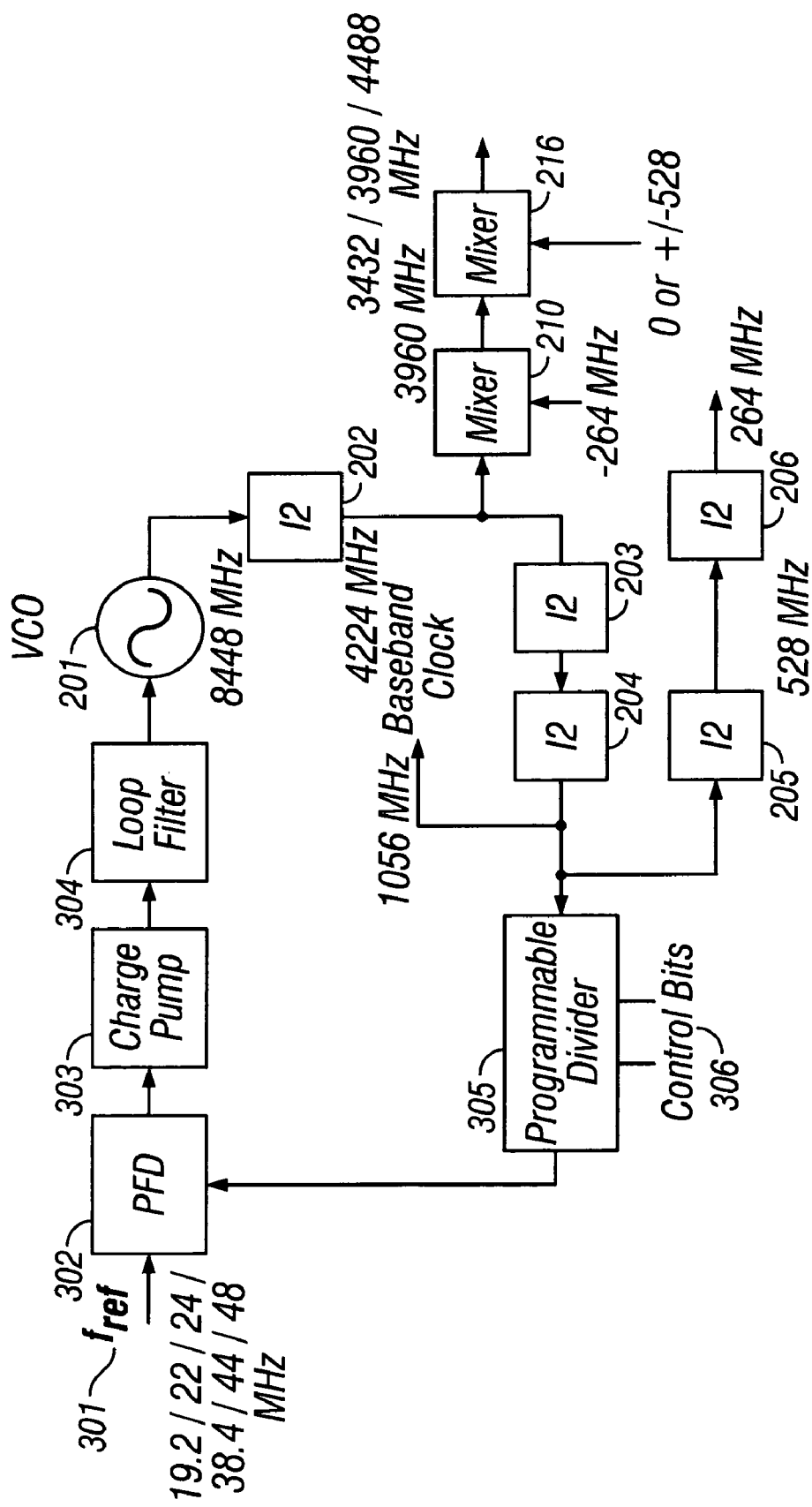
FIG. 3 shows the frequency synthesizer architecture for band group #1 incorporated into a phase locked loop.

FIG. 3 shows the frequency synthesizer architecture for band group #1 incorporated into a phase locked loop. The architecture of the present invention can form part of a phase locked loop (PLL) wherein the VCO is stabilized at the necessary frequency by the loop. The PLL compares a reference frequency (typically the crystal frequency or one derived from a stable source) with the divided version of the VCO frequency (produced by a chain of dividers). If there is a discrepancy between the divided VCO frequency and the reference frequency the PLL adjusts the VCO as necessary.

In the present example, the division of the VCO frequency is performed by the dividers 202-204 that help produce the band frequencies for band group #1. The dividers 202-206 and mixers 210, 216 depicted in FIG. 3 are the same as those depicted in FIG. 2. However, since this embodiment only generates band group #1, the synthesizer architecture is simplified from that shown in FIG. 2.

The reference frequency 301 is typically determined by the crystal frequency. The most common frequencies are 19.2, 38.4, 22, 44, 24 or 48 MHz. Currently these are the most commonly used crystal frequencies in wireless applications and are low cost to produce, but the architecture of the present invention is not limited to these frequencies. If the frequency synthesizer is to be part of a UWB system that is going to coexist with other wireless standards in the same product, and might share the same crystal, the crystal frequency should be generated from the VCO frequency.

As with the example in FIG. 2, the signal from the VCO 201 is sent through five dividers 202-206, each of which divides the frequency by two. After passing through divider 204, the signal has a frequency of 1056 MHz, which is used as the baseband clock just as in FIG. 2. The 1056 MHz signal is also used by the PLL as a feedback signal. The generation of the band frequencies in band group #1 via dividers 205 and 206 and mixers 210 and 216 proceeds the same way as described above in relation to FIG. 2.

For the PLL, having integer division in the feedback loop is easier to implement, and in the case of the above reference frequencies 1056 MHz is an integer multiple of all of those crystal frequencies.

A programmable divider 305 divides the 1056 MHz feedback signal by an integer specified by control bits 306 in order to achieve the specified reference frequency. For example, if 44 MHz is the reference frequency, then the control bits 306 will instruct the programmable divider 305 to divide the feedback signal by 24.

A phase frequency detector (PFD) 302 compares the feedback signal generated by the programmable divider 305 with the reference frequency 301 to check for phase and frequency differences. Ideally, the divided feedback signal should be identical to the reference frequency. However, the VCO may deviate from its specified frequency due to process and temperature variations. For example, if the reference frequency 301 in FIG. 3 is 44 MHz and the VCO has a frequency of 8400 MHz (instead of 8448), the divided feedback frequency generated by programmable divider 305 will be 43.75 MHz.

If the PFD 302 detects a discrepancy between the divided feedback signal and the reference input 301 it instructs the charge pump 303 to adjust the VCO frequency by periodically injecting or extracting current into the loop filter 304 which produces the voltage that drives the VCO, thereby reducing error between the divided VCO frequency and reference frequency. To ensure the stability of the loop and not allow significant change in the loop dynamics, the charge pump current should also be programmed along with the programming of divider 305.

Using the above example, the charge pump 303 would periodically inject current into the loop filter 304 in order to increase the control voltage on the loop filter, thereby increasing the VCO frequency from 8400 MHz to 8448 MHz. The next feedback signal taken from the VCO would be evaluated by the PLL to determine if the adjustment was successful. This process continues until the VCO oscillates at the desired frequency and is stable.

The architecture of the present invention can also be implemented with an independent PLL that does not incorporate any of the components of the frequency synthesizer. However, incorporating elements of the frequency synthesizer into the PLL (as shown in FIG. 3) reduces the complexity and cost of the system.

An alternate embodiment of the present invention allows the generation of band frequencies in quadrature, wherein two data signals are 90° out of phase with each other. To generate the channel frequencies in quadrature, the mixers used in the architecture should be quadrature mixers, which require only one of the inputs to the mixer to be in quadrature. Since the preferred embodiment of the present invention employs dividers that divide by two, every division results in quadrature signals. Hence quadrature mixers can easily be implemented with these signals without any other changes made to the architecture. In FIG. 2 it is clear that every mixer has at least one input which would be in quadrature assuming all mixers are quadrature.

With the availability of quadrature signals, single sideband mixers can be used to achieve higher sideband rejection, resulting in spectrally pure band frequencies, which is a practical necessity in radio systems. However, a single sideband mixer requires each of its inputs to be in quadrature.

For band groups 1 and 2 single sideband mixers can be implemented with the components used in FIG. 2 with the addition of a phase shifter to have the 1584 MHz signal in quadrature. However, usage of single sideband mixers for band groups 3, 4 and 5 would require the 8448 MHz signal to be in quadrature apart from 1584 MHz. This can be obtained using dedicated phase shifters each for 8448 and 1584 MHz. Alternatively, a quadrature VCO at 8448 MHz or a VCO at 16896 MHz followed by a /2 divider can also result in 8448 MHz in quadrature. Such frequencies can be achieved for the VCO using current complementary metal-oxide-semiconductor (CMOS) and bipolar CMOS (BiCMOS) technologies.

On the whole, the architecture presented can be used to cover the mandatory as well as the optional bands of the multi-band OFDM band plan. When not using the optional bands, some of the components can be powered down to save power. The architecture also provides users the flexibility to choose the reference frequency of the PLL through its programmable divider.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

I claim:

1. An apparatus for wireless communications comprising:
   (a) an oscillator that generates an electronic signal;
   (b) frequency dividers;
   (c) frequency selectors; and
   (d) frequency mixers,
   wherein the electronic signal generated in part (a) is sequentially divided by the frequency dividers to produce a first group of frequencies, and wherein the frequency selectors and frequency mixers select and mix the first group of frequencies according to instructions from control bits to produce a second group of frequencies, wherein there are a plurality of configurations for the control bits, each of at least 14 transmission carrier frequencies of an ultra-wideband (UWB) spectrum corresponding to at least one of the configurations, the 14 transmission carrier frequencies comprising 3432, 3960, 4488, 5016, 5544, 6072, 6600, 7128, 7656, 8184, 8712, 9240, 9768, and 10296 MHz.

2. The apparatus according to claim 1, wherein the 14 frequencies are grouped into five groups, wherein the control bits are configurably set such that the second group of frequencies comprises any of the five groups, the five groups being listed as follows: a first group consisting of 3432, 3960, and 4488 MHz, a second group consisting of 5016, 5544, and 6072 MHz, a third group consisting of 6600, 7128, and 7656 MHz, a fourth group consisting of 8184, 8712, and 9240 MHz, and a fifth group consisting of 9768, and 10296 MHz.

3. The apparatus according to claim 2, wherein the second group of frequencies comprise a combination of the five groups.

4. The apparatus according to claim 1, wherein one of the frequencies in the first group of frequencies is used as a baseband clock signal.

5. The apparatus according to claim 1, wherein the second group of frequencies comprises 8 or more of the 14 frequencies of the ultra-wideband (UWB) spectrum.

6. The apparatus according to claim 1, wherein the second group of frequencies comprises all of the 14 frequencies of the ultra-wideband (UWB) spectrum.

7. A method for generating carrier frequencies for a wireless communications system, the method comprising the steps of:
   (a) generating an electronic signal with an oscillator;
   (b) dividing said signal into a first group of frequencies; and
   (c) selecting and mixing said first group of frequencies into a second group of frequencies according to instructions from control bits, wherein there are a plurality of configurations for the control bits, each of at least 14 transmission carrier frequencies of an ultra-wideband (UWB) spectrum corresponding to at least one of the configurations, the 14 transmission carrier frequencies comprising 3432, 3960, 4488, 5016, 5544, 6072, 6600, 7128, 7656, 8184, 8712, 9240, 9768, and 10296 MHz, wherein the first group of frequencies and second group of frequencies are generated in quadrature.

8. The method according to claim 7, wherein the 14 frequencies are grouped into five groups, wherein the control bits are configurably set such that the second group of frequencies comprises any of the five groups, the five groups being listed as follows: a first group consisting of 3432, 3960, and 4488 MHz, a second group consisting of 5016, 5544, and 6072 MHz, a third group consisting of 6600, 7128, and 7656 MHz, a fourth group consisting of 8184, 8712, and 9240 MHz, and a fifth group consisting of 9768, and 10296 MHz.

9. The method according to claim 8, wherein the second group of frequencies comprise a combination of the five groups.

10. The method according to claim 7, further comprising using one of the frequencies in the first group of frequencies as a baseband clock signal.

11. The method according to claim 7, wherein the second group of frequencies comprises 8 or more of the 14 frequencies of the ultra-wideband (UWB) spectrum.

12. The method according to claim 7, wherein the second group of frequencies comprises all of the 14 frequencies of the ultra-wideband (UWB) spectrum.

13. An apparatus for wireless communication comprising:
means for generating an electronic signal with an oscillator;
means for dividing said signal into a first group of frequencies; and
means for selecting and mixing said first group of frequencies into a second group of frequencies according to instructions from control bits, wherein there are a plurality of configurations for the control bits, each of at least 14 transmission carrier frequencies of an ultra-wideband (UWB) spectrum corresponding to at least one of the configurations, the 14 transmission carrier frequencies comprising 3432, 3960, 4488, 5016, 5544, 6072, 6600, 7128, 7656, 8184, 8712, 9240, 9768, and 10296 MHz,
wherein the first group of frequencies and second group of frequencies are generated in quadrature.

14. The apparatus according to claim 13, wherein the 14 frequencies are grouped into five groups, wherein the control bits are configurably set such that the second group of frequencies comprises any of the five groups, the five groups being listed as follows: a first group consisting of 3432, 3960, and 4488 MHz, a second group consisting of 5016, 5544, and 6072 MHz, a third group consisting of 6600, 7128, and 7656 MHz, a fourth group consisting of 8184, 8712, and 9240 MHz, and a fifth group consisting of 9768, and 10296 MHz.

15. The apparatus according to claim 14, wherein the second group of frequencies comprise a combination of the five groups.

16. The apparatus according to claim 13, wherein one of the frequencies in the first group of frequencies is used as a baseband clock signal.

17. A wireless communication device comprising:
an antenna;
an oscillator that generates an electronic signal;
frequency dividers;
frequency selectors; and
frequency mixers
wherein the oscillator signal generated is sequentially divided by the frequency dividers to produce a first group of frequencies, and wherein the frequency selectors and frequency mixers select and mix the first group of frequencies according to instructions from control bits to produce a second group of frequencies, wherein there are a plurality of configurations for the control bits, each of at least 14 transmission carrier frequencies of an ultra-wideband (UWB) spectrum corresponding to at least one of the configurations, the 14 transmission carrier frequencies comprising 3432, 3960, 4488, 5016, 5544, 6072, 6600, 7128, 7656, 8184, 8712, 9240, 9768, and 10296 MHz, wherein the second group of frequencies are used in generating signals to be transmitted via the antenna or in processing signals received via the antenna.

18. The wireless communication device according to claim 17, wherein the 14 frequencies are grouped into five groups, wherein the control bits are configurably set such that the second group of frequencies comprises any of the five groups, the five groups being listed as follows: a first group consisting of 3432, 3960, and 4488 MHz, a second group consisting of 5016, 5544, and 6072 MHz, a third group consisting of 6600, 7128, and 7656 MHz, a fourth group consisting of 8184, 8712, and 9240 MHz, and a fifth group consisting of 9768, and 10296 MHz.

19. The wireless communication device according to claim 18, wherein the second group of frequencies comprise a combination of the five groups.

20. The wireless communication device according to claim 17, wherein one of the frequencies in the first group of frequencies is used as a baseband clock signal.

* * * * *